UNITED STATES PATENT OFFICE.

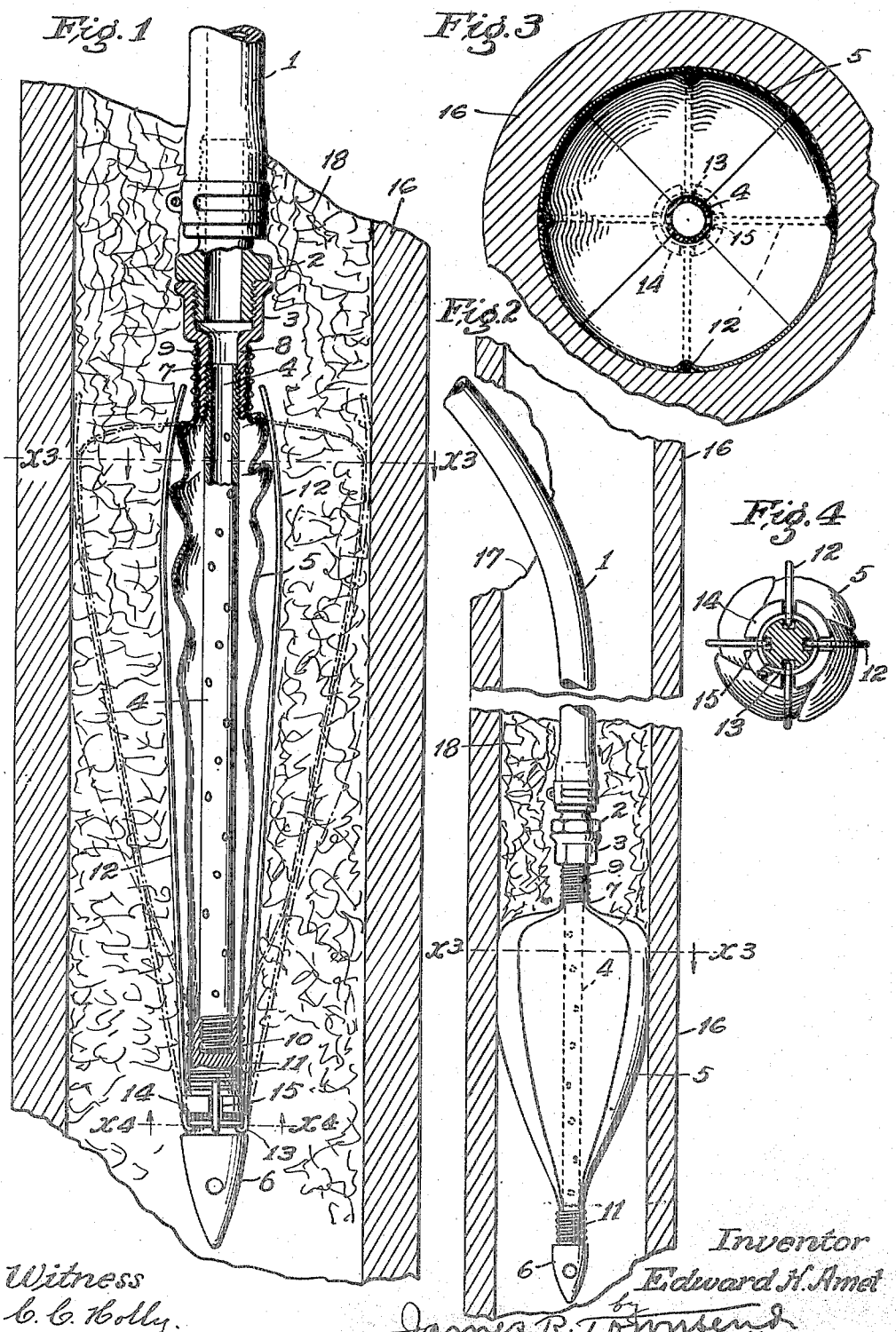

EDWARD H. AMET, OF REDONDO BEACH, CALIFORNIA, ASSIGNOR OF ONE-HALF TO CHARLES J. FUNK, OF REDONDO BEACH, CALIFORNIA.

DRAIN-PIPE CLEANER.

1,308,469.   Specification of Letters Patent.   Patented July 1, 1919.

Application filed April 3, 1919. Serial No. 287,339.

*To all whom it may concern:*

Be it known that I, EDWARD H. AMET, a citizen of the United States, residing at Redondo Beach, in the county of Los Angeles and State of California, have invented a new and useful Drain-Pipe Cleaner, of which the following is a specification.

An object of this invention is to remove accumulations that occur in drain pipes. The obstructions which are likely to occur in drain pipes are usually of a soft character and may be formed by tiny rootlets growing through some small clearance in the pipe, and then enlarging inside to a spongy mass which absorbs water and thus feeds the tree from which the root came, and this accumulation affords obstruction to paper or other soft substances which would otherwise pass through the drain pipe. This frequently necessitates digging up the drain pipe and breaking it loose at the place of obstruction, thus necessitating the removal of a large portion of pipe.

An object of this invention is to provide means whereby such soft obstructions can be removed and the drain pipe can be thoroughly cleaned with ease and without destroying any of the pipe, excepting such portion as may be necessary to introduce the cleaner to the interior thereof.

The invention is broadly new, primary basic and pioneer in that I provide a collapsible head capable of being expanded by air or water pressure; and, connected to the same, a hose which is sufficiently stubborn to force the collapsed appliance into the soft obstructing mass far enough to allow subsequent expansion of said head to cut off a portion of said mass, or to fill the space behind the same; depending upon whether the head is pushed only part way or entirely through the mass; and providing said hose with a fluid pressure adapted to expand said head; said hose being strong enough to retract the substance that is cut off or caught behind the expanded head.

Further objects of the invention are cheapness, simplicity, ease and convenience of operation.

Other objects, advantages and features of invention may appear from the accompanying drawing, the subjoined detail description and the appended claims.

The accompanying drawing illustrates the invention.

Figure 1 is a fragmental view of a pipe cleaner constructed in accordance with this invention and placed inside a pipe and inserted in collapsible form beyond an obstruction, a part of which is shown. A pipe fragment is shown in longitudinal mid-section. Dash lines indicate the expanded form of the head.

Fig. 2 is a fragmental view on a smaller scale of the cleaner, omitting the ribs shown in Fig. 1, and expanded in a pipe preparatory to drawing out an obstruction.

Fig. 3 is a transverse section of the expanded cleaner on the scale of Fig. 1 at the line indicated by $x^3$ in Figs. 1 and 2.

Fig. 4 is a transverse section on line $x^4$ Fig. 1 in collapsed position.

The hose 1 may be an ordinary garden hose, which may be of any well-known form, either wire-wound or plain, or otherwise constructed, provided the hose is of such stubbornness as to be adapted to force the head into or through such soft obstructions as are likely to occur in soil pipes, drain pipes or the like. Said hose 1 is provided with the usual coupling member 2 and is adapted to be connected to and disconnected from the coupling member 3 which in turn is adapted for connection to a perforated tube 4, that is shown in the drawing as being screwed into the inside of the coupling member 3. Said perforated tube 4 extends a requisite distance within a bag 5, which may be of such construction that when it is expanded a portion between its ends will be tapering forward to spear point 6.

The end of the bag 5 toward the coupling member 3 is reduced to form a neck 7, which fits upon the outside of reduced portion 8 of the coupling member 3, which reduced portion is threaded to receive the tube 4. Said neck 7 may be fastened by any suitable means, and is shown as being secured to the member 3 by wrappings 9 of wire or other suitable material.

The spear head 6 is provided with a seat 10 to which the tube 4 is secured. In the drawing said seat is shown as a socket into which the forward end of the tube 4 is screwed. Said seat 10 also forms a seat for the spear end of the bag 5 which is secured to the seat by any suitable means as wrappings 11.

There may also be applied to the head, external ribs 12 hinged with an umbrella hinge 13, supported by shoulder 14, having notches 15 to accommodate the ribs.

The collapsible and expansible bag may be formed of canvas or other strong, flexible material adapted to entirely or largely retain the expanding fluid forced thereinto.

It is desirable at times that the obstruction should be wet so as to cause it to slip out of the pipe easily; and for this reason it is deemed preferable to so construct the bag as to allow some of the water supplied thereto to leak out for this purpose.

This result may be secured by making the bag of canvas and said bag tapers or narrows toward the tip or front end and the tip may or may not be supplemented by the spear head 6 at the tip of the device.

In practice, to remove an obstruction from a pipe, as indicated in Figs. 1 and 2, access to the interior of the pipe 16 may be gained by any suitable means, and if necessary by breaking a hole 17 into one side thereof at some place from which the obstruction may be reached by the cleaner. Then the collapsible head will be inserted through the hole and by means of the hose 1, will be pushed to and gradually worked into the soft mass 18, until a sufficient portion of the bag has passed a portion of the said mass. Then the hose 1 may be connected to a hydrant, not shown, supplying water under suitable pressure; whereupon hydrostatic pressure upon the interior of the bag will force said bag to expand, thus grappling or wholly or partly cutting off such portion of the mass as has been passed by the head. The operator will then pull upon the hose 1, thus removing a portion or all of the mass, depending upon the looseness thereof and also upon whether the head has passed entirely beyond the mass or whether it has not passed beyond the mass. The mass may have sufficient coherence to all be removed at once.

When the displaced obstructing mass has been brought to the opening through which the head was inserted, it may be removed either bodily or piecemeal; and then or before such time, the connection with the hydrant may be discontinued, and the hose may be again worked along the drain, and the operation just described be repeated, until the drain is entirely cleared at such points as may be within reach of the hose carried head from the opening in the drain.

The ribs 12 lie upon the outside of the bag and serve as a grapple to engage material, irrespective of the hydraulic, hydrostatic or pneumatic pressure, so that if it is desired to disconnect the hose from the hydrant before retraction, the grapple will take hold irrespective of any collapsed condition of the bag, which might then occur.

It is understood, however, that the grapple ribs 12 may be omitted as indicated in Fig. 2; the collapsible bag in most instances being found sufficient for the operation first above described.

I claim.

1. A pipe cleaner, comprising a head provided with a collapsible and expansible bag, and a hose adapted to supply fluid pressure inside the bag to expand the same, said hose being also adapted to serve as a handle by which the head may be driven into or worked past obstructions in the pipe.

2. A pipe cleaner, comprising a collapsible and expansible bag, a spear head and a hose adapted to supply fluid pressure inside the bag to expand the same, said hose being also adapted to serve as a handle by which the head may be driven into or worked past obstructions in the pipe.

3. In a pipe cleaner, a collapsible and expansible bag and a hose connected thereto, and adapted to force the collapsed bag into or past an obstruction in a pipe, and to supply fluid pressure to such bag to expand the same.

4. In a pipe cleaner, a collapsible and expansible bag and a hose connected thereto, and adapted to force the collapsed bag into or past an obstruction in a pipe, and means to supply water pressure to such bag to expand the same; said bag being somewhat permeable to allow water to leak therethrough to wet the obstruction.

5. A pipe cleaner comprising a hose, a perforated tube connected to said hose, a bag connected to said perforated tube and inclosing the perforated portion thereof; said bag being collapsible for insertion into or past an obstruction in a pipe, and said tube being adapted to hold the ends of the bag separated, so that when the bag is inserted into the obstruction it is effective upon expansion to grapple the obstruction into which it is inserted.

6. A pipe cleaner comprising a tube, a collapsible and expansible bag connected to said tube at opposite ends thereof, said tube being perforated within the bag to discharge water to expand the bag, and adapted for connection with a hose; and a pointed head connected to the tube and extending beyond the front end of the bag.

7. A pipe cleaner, comprising a hose, a perforated tube connected to said hose, a bag connected to said perforated tube and inclosing the perforated portion thereof; said bag being collapsible for insertion into or past an obstruction in a pipe, and said tube being adapted to hold the ends of the bag separated, so that when the bag is inserted into the obstruction it is effective upon expansion to grapple the obstruction into which it is inserted, and ribs hingedly connected to the tube in front of the bag and extending back over the bag to form grapples when the bag is expanded.

8. A hose, a tube connected to the hose, ribs free at one end and hinged at the other end to the tube and means within the ribs and connected to the hose to receive fluid pressure therefrom, and adapted to be expanded to extend the ribs, for the purpose set forth.

9. A pipe cleaner comprising a hose and a bag on the end of the hose adapted to receive fluid pressure therefrom, for the purpose of being expanded within or beyond an obstruction of the pipe for the purpose set forth.

In testimony whereof, I have hereunto set my hand at Los Angeles, California, this 27th day of March, 1919.

EDWARD H. AMET.

Witness:
JAMES R. TOWNSEND.